Aug. 15, 1933.　　　W. J. BROWN　　　1,922,195
HIGH FREQUENCY ELECTRICAL APPARATUS
Filed July 11, 1928
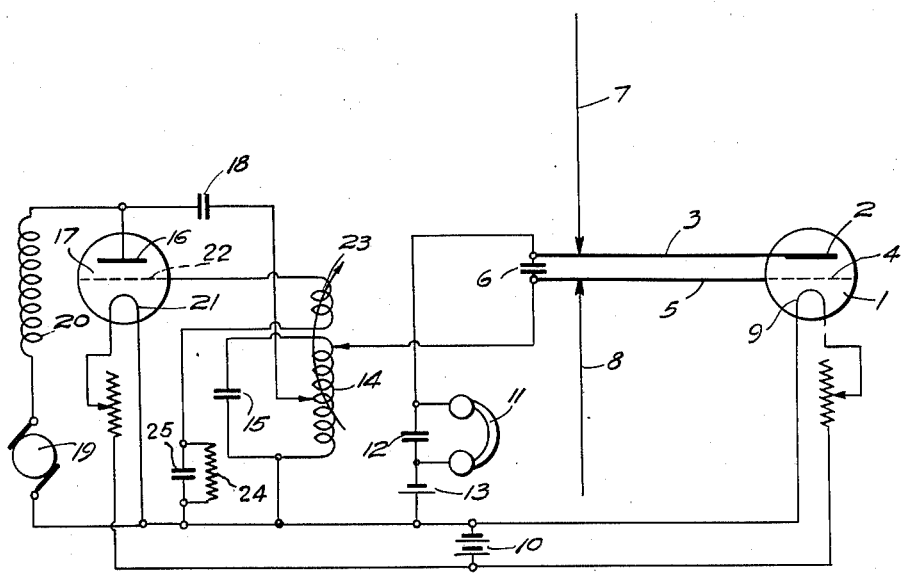
INVENTOR
Walter J. Brown.
BY
ATTORNEY Patented Aug. 15, 1933

1,922,195

UNITED STATES PATENT OFFICE 1,922,195

HIGH FREQUENCY ELECTRICAL APPARATUS

Walter John Brown, Brooklands, England, assignor to Associated Electrical Industries Limited, a Company of Great Britain Application July 11, 1928, Serial No. 291,977, and in Great Britain July 11, 1927

4 Claims. (Cl. 250—20)

This invention relates to high frequency electrical apparatus of the type employing one or more multiple electrode vacuum electric discharge devices.

A known type of high frequency oscillatory system is one in which the corresponding electrodes of two multiple electrode vacuum electric discharge devices are connected to a pair of parallel conductors (Lecher wires), and wherein the anodes of the devices are supplied with alternating current.

Furthermore, in United States Patent 1,790,197 dated January 27, 1931, there are disclosed super-regenerative and periodic trigger receivers wherein the anode of a retroactively coupled valve is supplied with alternating current only.

It is known that in certain circumstances, if the control electrode of a three-electrode thermionic valve is maintained highly positive with respect to the cathode, and the anode of the valve is maintained at a negative, zero or slightly positive potential with respect to the cathode, high frequency oscillations are generated in an oscillatory circuit connected between the cathode and the anode or between the control electrode and anode. This type of oscillator is known as the Barkhausen-Kurz oscillator.

The present invention takes advantage of the known phenomena above mentioned to provide a new apparatus for use in connection with very high frequency alternating electric currents and particularly in connection with the reception of such currents. According to the present invention an apparatus for reception of alternating currents of very high frequency, for example a frequency of from ten million to several hundred million cycles per second, comprises a Barkhausen-Kurz oscillator in a super-regenerative receiver. Upon the control electrode of the Barkhausen-Kurz oscillator tube there is impressed an alternating potential with or without a steady biasing potential which may be positive or negative in relation to the cathode. Upon the anode of said oscillator tube there is impressed a potential which is negative, zero or slightly positive with respect to the cathode.

The invention is illustrated in the accompanying drawing which is an electrical circuit diagram showing one embodiment of the invention. The anode 2 of a thermionic valve 1 is connected to a straight conductor 3. The control electrode 4 of the valve 1 is connected to a similar and parallel straight conductor 5. The conductors 3 and 5 are bridged by a condenser 6. The anode 2, conductor 3, condenser 6, conductor 5 and control electrode 4 form an oscillatory circuit in which oscillations of very high frequency can be maintained.

Antennæ 7 and 8 are adjustably connected to the conductors 3 and 5 respectively and serve as collectors for high frequency energy received from a distant transmitter or as radiators of high frequency energy generated by the apparatus.

The filamentary cathode 9 of the thermionic valve 1 is connected with a battery 10 which serves to supply energy for heating the cathode. The end of the conductor 3 adjacent the condenser 6 is connected through a pair of telephones 11 which is shunted by a condenser 12 to the negative terminal of a battery 13 of which the positive terminal is connected to the negative terminal of the battery 10. A small negative potential is thus impressed upon the anode 2. The end of the conductor 5 adjacent the condenser 6 is adjustably connected to a point on an inductance 14 of one of the oscillatory circuits of a generator of alternating current of frequency high but considerably lower than the frequency of the alternating current which can be maintained by the oscillatory circuit formed by the anode 2, conductor 3, condenser 6, conductor 5 and control electrode 4. One end of the inductance 14 is connected directly or through a bias battery (not shown) to the negative terminal of battery 10. The bias battery, if used, may be arranged to apply either a positive or a negative potential to the control electrode 4 in addition to the alternating current flowing from the inductance 14.

In the embodiment shown high frequency electrical oscillations are generated in the inductance 14 by including this in an oscillatory circuit associated with a thermionic valve. The inductance 14 is shunted by a condenser 15 so that it forms a closed oscillatory circuit which is tuned to the desired frequency. The anode 16 of a thermionic valve 17 is connected through a blocking condenser 18 to a point upon the inductance 14. The anode circuit of the valve 17 is supplied with high potential energy from a direct-current generator 19 of which one terminal is connected to the negative terminal of the battery 10 and the other terminal is connected through a high frequency choke coil 20 to the anode 16. The cathode 21 of the valve 17 is connected to the battery 10.

The control electrode 22 of the valve 17 is connected through an inductance 23 and through a high resistance 24 shunted by a condenser 25 to the negative terminal of the battery 10. The inductance 23 is so coupled to the inductance 14 that the valve 17 maintains oscillations in the oscillatory circuit formed by the inductance 14 and condenser 15.

The apparatus above described may be used as a generator of oscillations of very high frequency which are modulated at a lower frequency. The power which can be dealt with by the apparatus is however very limited on account of the large proportion of power which must be dissipated by the control electrode 4. When the apparatus is used as a generator, the telephones 11 and condenser 12 may be omitted.

The apparatus illustrated is suitable for use as a receiver of electrical oscillations of very high frequency and can be adjusted to work after the manner of a super-regenerative or periodic trigger receiver of electrical signals of very short wave length; in particular it may be used as a super-regenerative receiver for the reception of electric waves of very short wave length modulated at a supersonic frequency by adjusting the frequency of the alternating potential, applied to the conductor 5 and control electrode 4 by the inductance 14, valve 17 and associated parts, to differ from the modulation frequency of the electric waves by an audible frequency. For example where a transmitter is employed emitting a carrier wave modulated at a supersonic or radio frequency the super-regenerative receiver would be quenched at a frequency which is so related to the modulation frequency of the carrier wave that it forms therewith beats of audible frequency.

It will be appreciated that the above description is given by way of example only and that many modifications may be made without departing from the scope of the invention.

I claim as my invention:—

1. Apparatus for use in connection with the utilization of alternating currents at very high frequencies comprising a thermionic device having an electron-emitting electrode, an anode and a control-electrode, an oscillatory circuit comprising a plurality of conductors having uniformly dstributed capacity and inductance and extending from said anode and one of said electrodes, respectively, an oscillation generator tuned to a frequency materially lower than the frequency of said oscillatory circuit, and means for impressing upon said control-electrode alternating potentials derived from said oscillation generator, whereby said device is capable of functioning as a radio-receiver of the super-regenerative type.

2. A super-regenerative receiver for the reception of alternating currents at very high frequencies comprising a thermionic device having an electron-emitting electrode, an anode and a control-electrode, an oscillatory circuit to which one of said electrodes and said anode are connected to form a high-frequency generator, said anode being maintained at a lower potential than said control-electrode with respect to said cathode, an oscillation generator tuned to a frequency materially lower than the frequency of said oscillatory circuit, and means for impressing upon said control-electrode alternating potentials derived from said oscillation generator.

3. A radio receiver comprising an electric discharge device having an electron-emitting electrode, a plate electrode, and a control electrode, an oscillatory circuit comprising a plurality of substantially parallel conductors having uniformly distributed capacity and inductance, one of said conductors being connected to said plate electrode, the other of said conductors being connected to one of said other electrodes, means for maintaining said control-electrode more positive than said plate-electrode, an oscillation generator tuned to generate a frequency materially lower than the frequency of said oscillatory circuit, means for impressing signal energy into said oscillatory circuit and means for periodically impressing upon one of said tube electrodes alternating potentials derived from said oscillation generator.

4. A super-regenerative receiver comprising a Barkhausen-Kurz oscillator having an oscillatory circuit tuned to a high frequency, means including an oscillation generator tuned to generate a frequency materially lower than said high frequency for stopping the oscillation of said Barkhausen-Kurz oscillator periodically, said periodic stopping occurring at said lower frequency, means for impressing a radio signal upon said Barkhausen-Kurz oscillator, and a translating device in the output circuit thereof.

WALTER JOHN BROWN.